United States Patent
Fiterman

(10) Patent No.: US 11,893,088 B2
(45) Date of Patent: Feb. 6, 2024

(54) METHOD AND APPARATUS FOR CREATING HIGH-FIDELITY, SYNTHETIC IMAGERY FOR ARTIFICIAL INTELLIGENCE MODEL TRAINING AND INFERENCE IN SECURITY AND SCREENING APPLICATIONS

(71) Applicant: Cignal LLC, Reedsville, PA (US)

(72) Inventor: Eric M. Fiterman, Reedsville, PA (US)

(73) Assignee: Cignal LLC, Reedsville, PA (US)

( * ) Notice: Subject to any disclaimer, the term of this patent is extended or adjusted under 35 U.S.C. 154(b) by 153 days.

(21) Appl. No.: 17/320,792

(22) Filed: May 14, 2021

(65) Prior Publication Data
US 2022/0076061 A1 Mar. 10, 2022

Related U.S. Application Data

(60) Provisional application No. 63/024,709, filed on May 14, 2020.

(51) Int. Cl.
*G06F 18/28* (2023.01)
*G06F 18/214* (2023.01)
*G06F 18/21* (2023.01)

(52) U.S. Cl.
CPC ............ *G06F 18/28* (2023.01); *G06F 18/214* (2023.01); *G06F 18/2178* (2023.01)

(58) Field of Classification Search
CPC .... G06F 18/28; G06F 18/214; G06F 18/2178; G06N 20/00; G06V 20/60; G06V 2201/05; G06V 10/774; G06V 10/82; G06Q 50/26
See application file for complete search history.

(56) References Cited

U.S. PATENT DOCUMENTS

| | | | |
|---|---|---|---|
| 11,257,272 B2 * | 2/2022 | Rowell | G06T 1/0014 |
| 2013/0013242 A1 * | 1/2013 | Joyce | G01N 23/087 702/100 |
| 2018/0114264 A1 * | 4/2018 | Rafii | G06T 15/50 |
| 2018/0157933 A1 | 6/2018 | Brauer et al. | |
| 2019/0043243 A1 * | 2/2019 | Chui | G06T 7/40 |
| 2019/0340810 A1 * | 11/2019 | Sunkavalli | G06T 15/506 |
| 2021/0085279 A1 * | 3/2021 | Asano | G01N 23/046 |
| 2022/0292548 A1 * | 9/2022 | Gabale | G06F 3/013 |
| 2022/0323030 A1 * | 10/2022 | Manalad | G06F 18/24137 |

OTHER PUBLICATIONS

International Search Report issued in co-pending application No. PCT/US2021/032489 dated Sep. 23, 2021.

* cited by examiner

*Primary Examiner* — Wesley J Tucker
(74) *Attorney, Agent, or Firm* — Whiteford, Taylor & Preston, LLP; Peter J. Davis

(57) ABSTRACT

New software systems and capabilities that facilitate the rapid development, evaluation, and deployment of advanced inspection and detection systems using high-fidelity synthetic imagery. The present invention generates high-fidelity synthetic imagery for detection systems that analyze data across the electromagnetic spectrum in an automated, random, directed, or semi-directed manner.

15 Claims, 2 Drawing Sheets

METHOD AND APPARATUS FOR CREATING HIGH-FIDELITY, SYNTHETIC IMAGERY FOR ARTIFICIAL INTELLIGENCE MODEL TRAINING AND INFERENCE IN SECURITY AND SCREENING APPLICATIONS

BACKGROUND OF THE INVENTION

Field of the Invention

The present invention relates to methods and devices for developing synthetic imagery for artificial intelligence model training and inference in security and screening applications.

Description of the Background

High-performance artificial intelligence (AI) models require large amounts of labeled training data to create accurate, performant systems. Generating large amounts of training data is typically a very labor-intensive, manual process, with some object recognition models requiring tens of thousands of labeled images per object class. This is made more difficult for imaging systems outside of the visible spectrum, where imagery is more difficult, time-consuming, or expensive to obtain or generate.

SUMMARY OF THE INVENTION

The inventions disclosed herein constitute new software systems and capabilities that facilitate the rapid development, evaluation, and deployment of advanced inspection and detection systems using high-fidelity synthetic imagery. The present invention generates high-fidelity synthetic imagery for detection systems that analyze data across the electromagnetic spectrum in an automated, random, directed, or semi-directed manner. Accordingly, the invention automatically generates 2D and 3D imagery, complete with supplemental scene data (e.g. object masks, bounding boxes, labels, or similar) for AI models used in detection, screening, and security applications. This imagery may be used alone or supplemented with real data to create a hybrid training dataset.

The invention automatically generates compact scene representations of complex 3D scenes from lightweight scene generation instructions that control how objects and materials may be placed, animated, or modified in 3D scenes. A physics solver is used to ensure that objects in a generated scene accurately reflect the behavior and interaction of physical materials, including fluids, gas, and solids. These compact scenes are processed by an electromagnetic radiation simulator that is capable of simulating a variety of virtual imaging systems, for example, X-Ray, Computed Tomography (CT) systems, infrared, ultraviolet, gamma ray, millimeter wave (mmwave), muon tomography, LiDAR or laser altimetry, or any other imaging system. The electromagnetic radiation simulator outputs 2D or 3D imagery, complete with supplemental scene data (e.g. object masks, bounding boxes, labels, or similar), to enable unsupervised and continuous AI model training or inference activities.

The ability to generate labeled AI training images in an automated manner enables the creation of advanced detection systems with capabilities that far supersede existing systems. AI models trained using synthetic data could be used to build next-generation detection models with far greater accuracy and more advanced detection capabilities.

Accordingly, there is provided according to the invention an apparatus for generating synthetic imagery for training artificial intelligence models for security and screening applications, comprising: at least one processor; at least one non-transient computer memory; an object library stored on said at least one non-transient computer memory including a pre-defined catalog of items selected from the group consisting of electronics, weapons, explosives, incendiaries, drugs and narcotics, luggage, backpacks, boxes, enclosures, vehicles, human figures, and other arbitrary items of interest; a data management module stored on said at least one non-transient computer memory and containing computer readable instructions executable by said at least one processor for loading and saving data files representing arbitrary shapes, objects, and geometries, and converting various data models into optimized data structures; a materials library stored on said at least one non-transient computer memory including a pre-defined catalog of physical materials and associated properties that may be simulated for different electromagnetic energies; a scene management module for selection and management of objects for a scene, said scene comprising a collection of objects and configuration parameters governing a desired simulation, such as the physics engine, object position and motion, and material properties for objects in the scene, the module stored on said at least one non-transient computer memory and containing computer instructions executable by said at least one processor for storing compressed, representations of objects and properties into scene data configured to be uncompressed and loaded at run-time during simulation; an electromagnetic radiation simulator stored on said at least one non-transient computer memory and containing computer readable instructions executable by said at least one processor for generating synthetic imagery for a particular scene; a data generation module stored on said at least one non-transient computer memory and containing computer readable instructions executable by said at least one processor for converting collected data and measurements from the virtual imaging sensors into various 2D and 3D image output formats, wherein the data generation module includes capabilities for post data processing to achieve specific image quality objectives. This module supports algorithmic post-processing and neural network-based processing methods; and a display interface module stored on said at least one non-transient computer memory and containing computer readable instructions executable by said at least one processor for creating, displaying, and interacting with 3D scenes composed of arbitrary shapes, objects, paths, points, and geometries based on user entries.

There is further provided according to the invention an apparatus further including a virtual sensor library stored on said at least one non-transient computer memory containing electromagnetic emitter and detector properties defining how simulated electromagnetic radiation is emitted and collected, wherein said electromagnetic detector properties are selected from the group consisting of energy characteristics and profile, energy binning, frequency, amplitude, wavelength, beam configuration, emitter design and configuration, detector design and configuration, detector dimensions, detector resolution, exposure time, and gantry configuration.

There is further provided according to the invention an apparatus further including an object selection module stored on said at least one non-transient computer memory containing computer readable instructions executable by said at least one processor that allow users to select and define various regions of a three-dimensional object to segment and subdivide objects into constituent components, parts, or regions of interest, wherein said various regions may be defined by specifying spatial measurements, paths, or bounding regions of interest or may be defined using queries that evaluate stored material properties, including density, element, material type/class, or phase.

There is further provided according to the invention an apparatus further including an object modification module stored on said at least one non-transient computer memory containing computer readable instructions executable by said at least one processor that allow scene objects to be modified using a variety of algorithmic and neural network-based methods. Examples include 3D printing, drilling, inflation, compression, tearing, ripping, cutting, welding, gluing, burning, breaking, cracking, eroding, exploding, buckling, gapping, shaving, or bubbling.

There is further provided according to the invention an apparatus wherein material properties may also be modified using the object modification module, allowing users to evaluate how electromagnetic waves and particles interact with different materials and optional color properties for those materials when displayed in the display interface. Examples include changing the simulated properties of materials, for example, material density, attenuation, or material type, and wherein the object modification module permits higher-level complex modification processes to be defined from these methods. For example, an object tampering process could be defined that altered seams, joints, materials, or interconnections using a sequence or subset of these methods.

There is further provided according to the invention an apparatus further including a physics solver stored on said at least one non-transient computer memory containing computer readable instructions executable by said at least one processor to simulate various physical phenomena between fluids, fabrics, and soft and rigid bodies, including gravity, friction, repulsion, soft and rigid-body collisions, to simulate how objects may collide and interact with each other in world space. Bodies may be static or dynamic and follow various paths in the scene.

There is further provided according to the invention an apparatus further including an artificial intelligence module interface that enables a user to load a new or existing AI model to train the model or to perform inference to evaluate model performance on various generated scenes.

There is further provided according to the invention an apparatus wherein the data files represent simple or complex models, organic and manmade materials, human figures, vehicles, machines, packages, parcels, aircraft, or any other arbitrary item of interest.

There is further provided according to the invention an apparatus wherein the optimized data structures include any combination of slices, voxels, surfaces, meshes, triangles, procedural geometries, grids, points, lines, curves, or other data structures.

There is further provided according to the invention an apparatus wherein said scene management module further contains computer readable instructions executable by said at least one processor for packing objects into a variety of enclosures, for example a package, baggage, parcel, briefcase, pallet, box, human figure, cargo port, container, or vehicle.

There is further provided according to the invention an apparatus wherein scene scale is dynamic in which a scene may be created with very high resolution to support micro-CT scans, or may represent large, lower resolution scenes, for example, a simulated muon scan of a large commercial freight transportation truck.

There is further provided according to the invention an apparatus wherein said electromagnetic radiation simulator further contains computer readable instructions executable by said at least one processor for allowing a user to fine-tune the realism and speed of data generation by selecting various options that control the performance of the simulation engine to achieve desired results, for example, the number of images taken, the level of accuracy for the electromagnetic radiation simulator, sensor configuration, or to specify parameters regarding energy, propagation, absorption, reflection, and refraction of electromagnetic waves and particles with various bodies in a scene.

There is further provided according to the invention an apparatus wherein the display interface module allows shapes to be placed in arbitrary positions in world space and allows objects to be modified using other system modules and wherein the display interface module includes a menu system that allows users to select and configure various functions in the system, including sub-windows that permit various preview images and renderings to be displayed within a primary window.

There is further provided according to the invention a method for generating synthetic imagery for training artificial intelligence models for security and screening applications, comprising: building/assembling/storing a volumetric object library composed of various stream-of-commerce (SoC) items, contraband items (firearms, explosives, incendiaries, narcotics, controlled substances, etc.), items of interest, enclosures, vehicles, structures, animals, and human figures using a data management module that loads object data from a variety of 2D and 3D data as slices of real or virtual objects, surfaces, meshes, voxels, points, paths, lines, curves, 3D models, Computer-aided Design (CAD) files, or specified procedural geometries; building/assembling/storing a material samples library to define a set of substances and materials that may be used to synthesize volumetric objects composed from a variety of different virtual material swatches. Material swatches may be collected from samples extracted digitally from imported data sets using the object modification module, or may be loaded directly using known material characteristics (e.g. density, reflection, attenuation, etc.) (different materials result in varying collision behavior in a scene and also effect electromagnetic wave propagation during the electromagnetic radiation simulation); selecting one or more objects from the object library and selecting one or more materials from the materials objects, applying material selections to object selections, and combining a plurality of objects of different materials into a variety of scenes, wherein the scene management module packs or places objects into one or more enclosures randomly or using computerized instructions as part of the packing algorithm defined in the scene generation specification and wherein the scene management module is configured to use object layer data to alter material properties randomly or using specific algorithms (for example, the scene management module may create several different scenes from a single bottle object: a plastic bottle filled with gasoline and a glass bottle filled with milk); loading and populating a scene from the objects in the scene file definition into an electromagnetic radiation simulation engine configured to handle the placement, orientation, sizing, motion, materials, and deformations from the scene file definition; performing simulation of electromagnetic waves by the electromagnetic radiation simulation engine according to a supplied job configuration that details, for example, the number of images taken, the level of accuracy for the electromagnetic radiation simulator, imaging sensor configuration/resolution, etc. Users may also specify parameters regarding radiation energy, energy binning, frequency, amplitude, wavelength, propagation, absorption, reflection, and refraction of electromagnetic waves and particles with various bodies in a scene. The simulation workload may be a distributed across multiple devices, servers, or clouds to allow portions of a single scene to be processed in parallel for greater performance.

There is further provided according to the invention a method which included using a physics solver to process scene object properties and environmental settings to simulate how packed objects appear in the simulated enclosure, wherein hard objects, such as metal, are placed into the scene with flexible materials and soft bodies, in a way that simulates reality and wherein environmental parameters are used to control how objects are clustered or packed within an enclosure to result in a set of scene files that are compressed representations of objects packed into an enclosure, each scene containing details on the specific objects in the scene, their positions, materials, and calculations governing the behavior and deformation of soft bodies in the scene.

DETAILED DESCRIPTION

Figure 1:
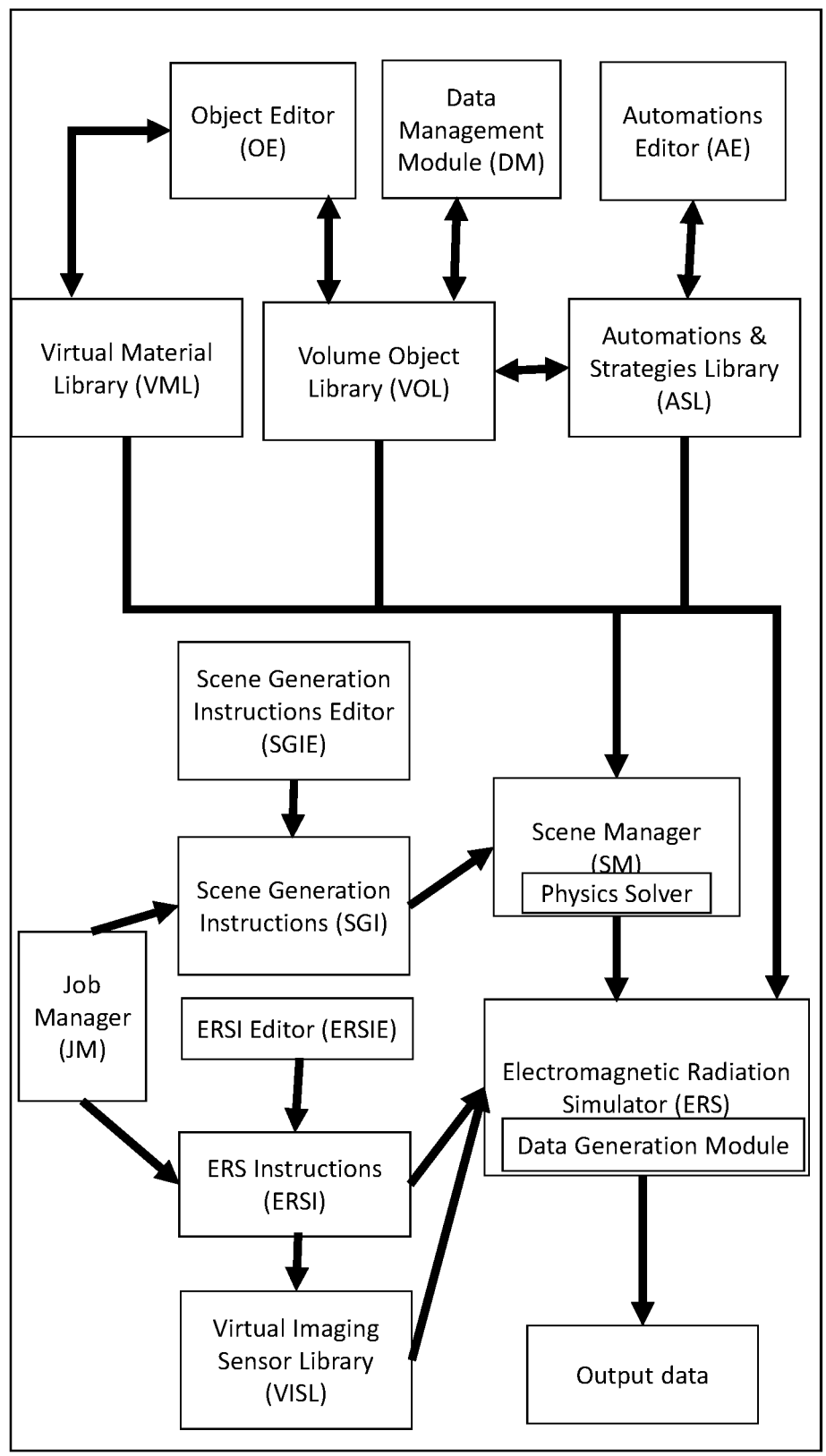
FIG. 1 is a representation of one embodiment of the invention.
Figure 2:
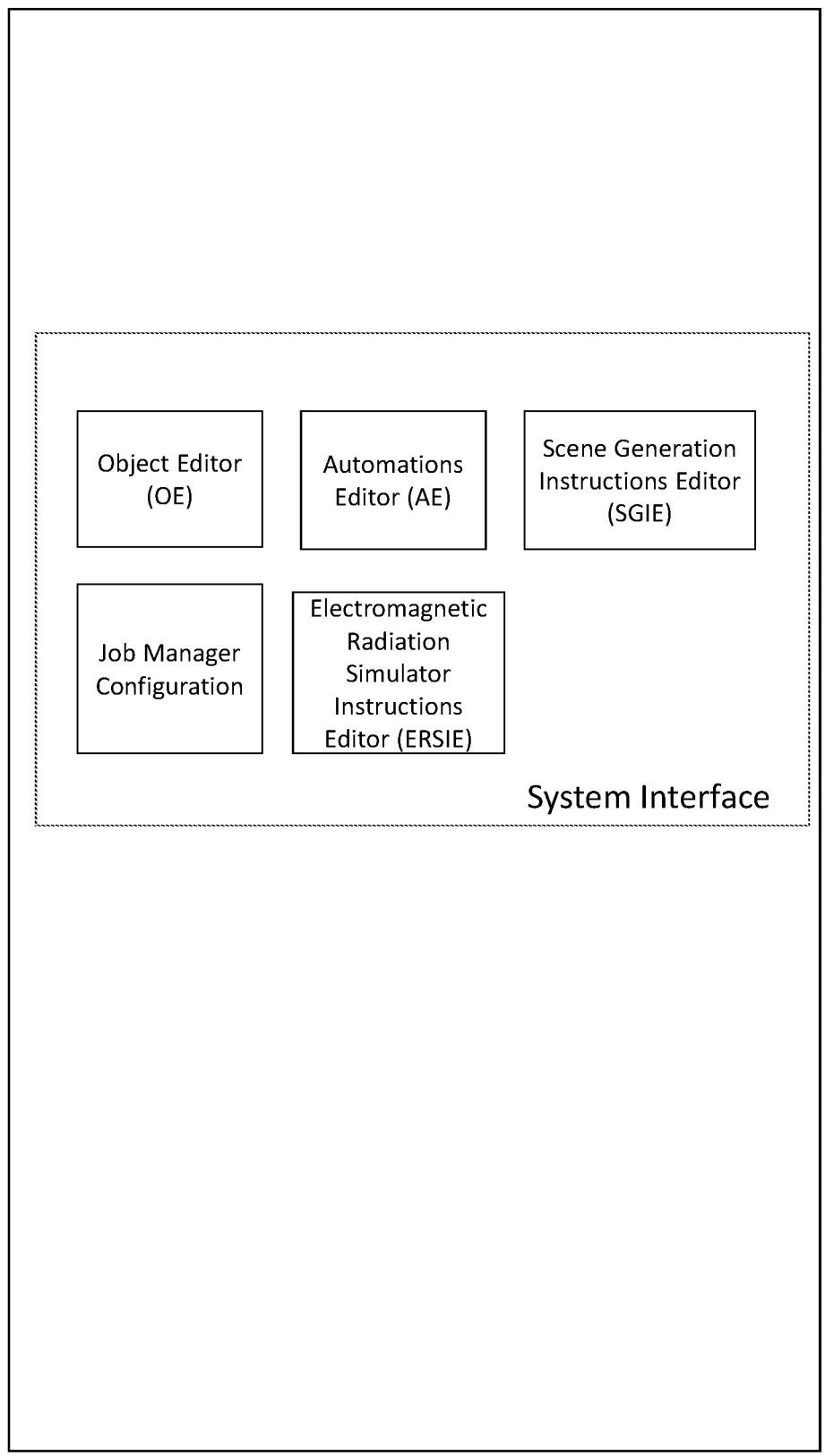
FIG. 2 is a representation of a systems interface according to an embodiment of the invention.

In order to efficiently and realistically populate a large number of synthetically-generated data scenes, the present invention provides systems and methods to edit, save, and retrieve object data from a virtual object library (VOL) that provides a pre-defined catalog of items that may be encountered at security checkpoints, ports, borders, inspection stations, or other screening locations, e.g., electronics, firearms, weapons, sharps, explosives, incendiaries, drugs and narcotics, alcohol, food and beverages, human figures, animals, plants, wildlife, fruits and vegetables, luggage, backpacks, boxes, enclosures, vehicles, aircraft, containers, and other arbitrary items of interest that may be placed into a scene. For commercial transportation use cases, the VOL may be used to generate luggage scenes that depict items commonly encountered in passenger air or ground transportation environments. For cargo and freight inspection use cases, this may involve depicting goods, commodities, cargo, containers, and vehicles commonly encountered in the shipping and freight industry at ports and border locations. For physical security screening use cases, a knife could be placed in the jacket pocket of a human figure. Custom objects may be added to the object library, for example, when a new or novel item of interest is identified and may be placed into a scene.

The VOL may be stored within a database, as a collection of data files, or as a custom or hybrid data structure. The VOL is responsible for managing the object data, metadata attributes, and other data necessary to render an object in a 3D environment. Metadata attributes may include object scale, orientation, position, object class/type (e.g. weapon, food, clothing, etc.), state (e.g. solid, liquid, gas), rigidity, volume, skinning data for articulation, temperature, material layer information used to segment or select portions of an object, material reference data, statistical information regarding the object (e.g. average, minimum, maximum values for attributes of the object), text data/description, object hierarchy data (when the object contains, for example, a collection of other objects), position markers to annotate regions of interest, or other custom attributes defined by the user. The object data stored in the VOL may express object data as a single or combination of slices, voxels, surfaces, meshes, triangles, procedural geometries, grids, points, lines, curves, or other data structures that may be used to render 2D or 3D shapes. Metadata may be stored separately or combined with the object data in the VOL depending on the use case.

There are two primary input interfaces to the VOL: the data management module (DM) and the object editor (OE). The DM provides for the importing, exporting, and converting data files representing arbitrary shapes, objects, and geometries into the VOL. The data files may represent simple or complex objects, organic or manmade materials, vehicles, machines, packages, parcels, aircraft, human figures, or other arbitrary items. The DM may import object data from a variety of 2D and 3D data formats, for example, as slices of real or virtual objects, surfaces, meshes, voxels, points, paths, lines, curves, 2D or 3D models, Computer-aided Design (CAD) files, 3D printing design files, images, procedural geometries, or other arbitrary data formats. The DM converts various data models into optimized data structures used by the VOL, which may utilize any combination of slices, voxels, surfaces, meshes, triangles, procedural geometries, grids, points, lines, curves, or other data structures as necessary.

The OE may be used to populate metadata attributes and data for objects in the VOL. For example, the OE may be used to measure object dimensions, annotate regions of interest, resize objects, add descriptions, and create layer data so that the system can modify and assign material and object properties for various object components during a simulation. The OE may be used to select and define various regions of a three-dimensional object to segment and subdivide objects into constituent components, parts, or regions of interest. Regions may be defined by specifying spatial measurements, paths, or bounding regions of interest or may be defined using queries that evaluate stored material properties, for example, density, element, material type/class, phase, or similar. For example, an object model of a bottle may be decomposed into a twist cap, internal bottle volume, and bottle surface. Segmenting a model in this way allows the system to substitute different materials for each component during the simulation, thus allowing a variety of bottles to be created from a single segmented bottle model.

The OE also provides functionality for modifying existing VOL objects or creating new objects using various editing tools, including scale, rotation, translation, merge, union, intersection, and subtraction operators that can be used to create complex and compound shapes from other objects in the VOL. For example, a user can use the OE to take a VOL object representing a small explosive device and merge the explosive into the heel of a VOL object representing a shoe as a novel type of explosive concealment. The resulting object may then be saved to the VOL as a new object. The OE may also use scripts defined in the ASL to modify VOL objects. The OE provides an interface that allows VOL objects to be modified through a user interface, script file, an application programming interface (API), a scene specification file, a command queue, or another mechanism.

The OE also provides capabilities to load and save 3D material swatches into a Virtual Material Library (VML). Material swatches allow a VOL object to be created from different materials, thereby resulting in varying collision behavior and electromagnetic wave behavior during scene simulation. The VML is responsible for managing metadata attributes and data necessary to create virtual objects composed of different materials. Virtual materials may include simple elements, metals, complex organic compounds, organic materials, plastics, glass, ceramics, fabrics, food, beverages, or any other material or substance in either solid, liquid, or gas form. The VML may be stored within a database, as a collection of data files, or as a custom or hybrid data structure. Metadata attributes may include swatch class/type (e.g. fabric, food, metal), state (e.g. solid, liquid, gas), density, color, transparency, attenuation, refraction and reflection coefficients for a particular electromagnetic energy profile, temperature, text data/description, or other custom attributes defined by the user. The swatch data stored in the VML may express object data as a single or combination of slices, voxels, surfaces, meshes, triangles, procedural geometries, grids, points, lines, curves, fill algorithms, neural networks, images, or other data structures that can be used to fill a region or selection of a VOL object with a specific material swatch with unique structural properties.

The Automations Editor (AE) contains functionality for accessing a pre-existing library of scripts stored in the Automations and Strategies Library (ASL) that may be used to modify objects, materials, and scenes in an automated fashion. Existing scripts may be edited and new scripts may be created in the AE and are accessible to the OE and the scene manager. The ASL may store the scripts as computer instructions within a database, within data files, or as a custom or hybrid data structure. Examples of pre-defined scripts in the ASL may include 3D printing, drilling, inflation, compression, tearing, ripping, cutting, welding, gluing, burning, breaking, cracking, eroding, exploding, buckling, gapping, shaving, or bubbling. Each script may include a number of options or variables to control the behavior of the script. For example, a 3D printing script allows objects to be 3D printed in a variety of infill patterns that control the density and internal structure of an object. The AE may also be used to define scripts governing the introduction of new materials, such as contaminants, into an object, material, or scene. For example, a script could be created that allowed the scene manager to "spray" metal shavings into a packaged food product. Another script may be created that "alters" welding seams in an air frame by introducing bubbles into a seam. The AE permits higher-level, compound, or multi-step scripts to be defined from other scripts in the ASL. For example, an object tampering automation may be defined in the AE that alters the shrink wrap of a bottle of medicine and introduces a foreign contaminant into the bottle. The AE may also be used to define various strategies used by the scene manager when creating scenes. For example, the AE may be used to create a script to hide narcotics within clothing, a script to place explosives or incendiaries within consumer electronic devices, or a strategy to place firearms components into different pockets of a jacket.

The scene manager (SM) is responsible for processing scene generation instructions (SGI) that direct the creation of one or more scenes using the VOL, VML, and ASL. SGI's may be provided and specified through a user interface, script file, an SGI template, an application programming interface (API), a command queue, or another mechanism. For example, an SGI template may define a scene using JavaScript Object Notation (JSON), XML, or another format, specifying name/value pairs to define a scene containing a minimum of 10 stream of commerce items, one weapon, and enclose the scene objects into either a briefcase, backpack, or purse:

{
   "num_stream_of_commerce": 10,
   "num_weapons": 1,
   "enclosures": ["briefcase", "backpack", "purse"]
}

An important part of the SM is a Physics Solver (PS) responsible for simulating physical and kinetic forces, such as gravity, wind, friction, inertia, and repulsive forces, to calculate collision behavior between objects in a scene. The PS is also responsible for applying computer algorithms to determine the behavior of enclosed materials, for example, fluids enclosed in a bottle. Bodies placed into a scene may be static or dynamic and follow various animated paths and frames in a scene. In the bottle example, the SM could be instructed to use layer data from a VOL object along with material swatches to create a metal bottle filled with gasoline, a flexible plastic bottle filled with carbonated orange soda, and a glass bottle filled with chocolate milk, all from the same VOL bottle object.

SGI data may be edited and modified using the SGI Editor (SGIE), a lightweight editor that allows scenes to be modified or new scenes to be created from existing scene data. Commands provided to the SM may specify a set of objects to be placed in a scene, which may be defined as a hierarchy or other relational data structure, a set of environmental parameters that control the operation of the Physics Solver, ASL algorithms that define specific strategies for placing and modifying objects in a scene, vehicle, or enclosure (e.g. pack a suitcase from the bottom up, hide narcotics within the center of a cargo container, place heaviest items at the bottom of a backpack), randomization settings that control the number and type of background or fill objects that may be placed into a scene, settings governing how the VML should be used to create new objects in scenes (e.g. swap fluids only, use flammables, etc.), animation frames that define how an object or set of objects should move within a scene, initial condition forces that define how certain objects move within a scene and may be impacted by physical forces (e.g. luggage tipped over or thrown from another position), the number of scenes to generate, or other custom commands to control the generation of output scenes. The SM workload may be a distributed across multiple devices, servers, or clouds to allow scene data to be generated in parallel for greater performance.

The output of the SM are scene data representing objects, their positions, orientations, velocities, and associated materials that are processed by the Electromagnetic Radiation Simulator (ERS). The ERS is a simulation engine that simulates the function of imaging systems that utilize various electromagnetic radiation, including X-Ray, X-Ray Computed Tomography (CT) systems, infrared, ultraviolet, gamma ray, visible spectrum, millimeter wave (mmwave), muon tomography, and any other system that uses electromagnetic radiation to generate 2D and 3D imagery. Scene data may be transmitted to the ERS via a queue, filesystem, API endpoint, or other mechanism and may be either pushed by the SM or pulled by the ERS in real-time or batch mode. Scene data output by the SM may also include a set of scene attributes, for example, a dynamic scene scale factor to control render sizing in the ERS. This would allow a scene to be created with very high resolution to support micro-CT scans, for example, or may represent large, lower resolution scenes, for example, imaging a large commercial freight transportation truck using muon tomography. Scene data may reference objects and materials in the VOL and VML to reduce duplication and allow the efficient transmission of scene data over a computer network, although VOL and VML data may be copied directly into a scene file when desired. Scene data also may specify skinning data, for example, to control the deformation and movement of shapes during rendering.

The ERS loads the generated scene data and creates the volumetric data structures by loading and resolving the placement, orientation, scale, motion, materials, and deformations of objects in a scene. ERS instructions (ERSI) direct the execution of the ERS simulation and may be provided and specified through a user interface, script file, an ERSI configuration template, an application programming interface (API), a command queue, or another mechanism. The ERSI provides a number of parameters governing the execution of the simulation, including, for example, the number of images taken, the level of accuracy for the simulator, a sensor profile from the Virtual Imaging Sensor Library (VISL) (discussed below), output data format, workload hosting parameters, memory limits, gantry start/stop angles, number of iterations for samples, Graphics Processing Unit (GPU) settings, and other parameters that may alter the performance of the ERS. Users may fine tune parameters regarding electromagnetic energy, propagation, absorption, reflection, and refraction of electromagnetic waves and particles with various bodies in a scene. The ERS may support a variety of simulation or data generation techniques, which may include Monte Carlo methods, ray-tracing, path tracing, neural network models, custom algorithms, or some combination thereof in order to achieve a variety of performance and quality objectives. The simulation workload may be a distributed across multiple devices, servers, or clouds to allow portions of a single scene to be processed in parallel for greater performance. ERSI data may be edited and modified using the ERSI Editor (ERSIE), a lightweight editor that allows simulation parameters to be modified or new simulations to be created from existing ERSI data.

The VISL is a library of pre-configured virtual imaging sensors and allows users to configure electromagnetic emitter and detector properties to control how simulated electromagnetic radiation is emitted and collected in a scene. Properties may include energy characteristics and profile, beam configuration, energy binning, amplitude, frequency, emitter shape and design, detector design, detector dimensions, detector resolution, gantry configuration, exposure time, or other properties commonly used to build, assemble, or deploy imaging systems. For example, the VISL may store virtual imaging sensor configurations to simulate X-Ray sensors, CT systems that use fixed or rotating gantries, millimeter wave advanced imaging technology, infrared imaging sensors, gamma ray inspection systems, or other imaging systems that simulate active or passive imaging across the electromagnetic spectrum.

A data generation module in the ERS is responsible for converting collected data and measurements from the virtual imaging sensors into various 2D and 3D image output formats. For Computed Tomography simulations, for example, the system performs tomography using synthetic radiographs and projections computed during the simulation. The data generation module provides user options for post data processing to achieve specific image quality objectives. This module supports algorithmic post-processing and neural network-based processing methods, that may, for example, process ERS outputs based on a neural network model that converts ERS outputs from ground truth data back to the original input data. The data output from ERS may include image data, other binary data, supplemental information for data labeling and classification, or any other information used by AI models, or any combination of these outputs. The output information generated from the ERS is then used as an input to train an AI model or perform inference using an existing AI model to evaluate run-time performance.

A Job Manager (JM) may be used to facilitate the execution and scheduling of jobs across the SM and ERS. The JM is responsible for invoking the SM and/or ERS with the appropriate configuration data (SGI and ERSI, respectively), for allocating job/work resources required to fulfill work on CPUs and GPUs, clouds, datacenters, or any other platform resources necessary to operate the system. The Job Manager configuration may be provided and specified through a user interface, script file, an JM template, an application programming interface (API), a command queue, or another mechanism.

Example 1

A user seeks to generate data to train an AI model to detect a novel type of 3D-printed weapon system in CT images of luggage. The user launches the master interface and invokes the DM to load a 3D print file format specification of the novel weapon system into the VOL, specifying a description for the object, the desired scale, and attributes indicating the object is in solid form. The weapon system plans indicate that the weapon has two distinct parts that may be printed in different filaments, so the user uses the OE to select these two distinct parts, ensuring that each part is saved as a new layer attribute within the object's entry in the VOL. The user then selects a pre-configured SGI template that specifies, in JSON format, instructions to generate 1,000,000 scenes that randomly place up to 20 consumer objects from the VOL into backpacks, briefcases, and duffle bags. The user then uses the SGIE to edit the SGI template to specify the newly created VOL weapon should be inserted into the generated luggage scenes. The user uses the SGIE to specify that the VOL weapon should be instantiated with ten varieties of 3D printing filaments from the VML for the first part, specifying ten different 3D printing infill patterns from the ASL for the first part, and ten types of metal alloys from the VML for the second part, yielding a total of one-thousand different variations of the weapon that will be inserted into the generated scenes. The user then saves this SGI template as a new SGI template file which may be re-used for other data generation jobs for other VISL sensor profiles, for example, 2D X-Ray inspection tasks. The user creates a new job in the master interface, selecting the newly created SGI template, selecting the CT imaging system sensor profile from the VISL to attach the SGI and ERSI configurations to the job, specifying that data should be generated on a local file share, should use two GPUs, and should be processed in real-time instead of in batches. The user then launches the job from the master interface, which invokes the SM to begin generating scene data from the SGI template in the job configuration. As new scenes are created from the SM, the SM places the scene data into files on a local file share that are then processed in real-time by the ERS using the CT image sensor profile specified in the job configuration. The output from the ERS are synthetic CT training data corresponding to the 1,000,000 scenes, each containing one of the one-thousand versions of the novel weapon system packed in luggage among other items as specified in the SGI template.

Example 2

A user seeks to generate data to test the performance of a variety of AI models in detecting the novel 3D-printed weapon system defined in Example 1 in millimeter wave images of passengers at airport security checkpoints. The user launches the master interface and invokes the SGIE to edit the SGI scene template that was created in Example 1 to generate luggage scenes of the novel type of 3D-printed weapon system. The user edits the SGI template to specify that instead of placing the weapon into luggage, the weapon will be hidden under the clothing of one of two-hundred randomly selected human figure models from the VOL. The user also updates the SGI template to indicate that only one-thousand images will be created. All other configuration areas of the SGI template remain the same. The user begins creating a new job in the master interface, selecting the newly created SGI template, selecting the millimeter wave imaging system sensor profile from the VISL, specifying that data should be submitted to a queue connecting the SM and ERS, should use ten GPUs, and should be processed in real-time. The user then launches the new job in the master interface, which invokes the SM to begin generating scene data from the SGI template in the job configuration. As new scenes are created from the SM, the SM places the scene data into a real-time queue that is processed in real-time by the ERS using the mmwave image sensor profile specified in the job configuration. The output from the ERS are synthetic mmwave image data corresponding to the 1,000 scenes, each containing one of the one-thousand versions of the novel weapon system hidden under the clothing of human figures. This data is then used to perform inference using the different AI models to evaluate their performance against this new data set.

Example 3

A user seeks to generate data to train an AI model to detect contraband during X-Ray inspections of vehicles and containers conducted at a port of entry. The user launches the master interface and invokes the SGIE to create an SGI template for hiding contraband in vehicles at the port of entry. The user then specifies that the system should generate 1,000,000 scenes that randomly selects a vehicle from the VOL and selects the smuggling automation script stored in the ASL to hide a VOL contraband item in the vehicle for 5% of the generated scenes. The user then saves this SGI template as a new SGI template file which may be re-used for other data generation jobs for other VISL sensor profiles, for example, thermal/infrared inspection tasks. The user then uses an API to invoke the scene manager, specifying the newly created SGI port of entry smuggling template and options to create files on a network accessible folder. The SM generates the scene files which are placed into a network accessible folder. The user begins creating a new job in the master interface, selecting the folder containing the newly created scene files and selecting the 2-D industrial X-Ray inspection imaging system sensor profile from the VISL to create synthetic 2-D X-Ray image data of vehicles at a port of entry. The user then launches the new job in the master interface, which invokes the ERS to begin processing the scene data using the X-Ray image profile specified in the job configuration. The output from the ERS are synthetic X-Ray training data corresponding to the 1,000,000 scenes, which may be used for AI model training or inference tasks.

Example 4

A user seeks to generate data to train an AI model to perform an inventory of vehicles, including a new type of electric vehicle, detected in shipping containers using muon tomography at a port of entry. The user launches the master interface and invokes the DM to load a muon tomography scan of the new type of electric vehicle into the VOL, specifying a description for the object, the manufacturer, weight, origin, and the object type ("vehicle"). The user then identifies an existing SGI template that automatically places vehicles into shipping container scenes and uses a command-line script to invoke the scene manager, specifying the existing SGI vehicle cargo template. The SM generates the scene files which are transmitted to a cloud storage service. After the SM completes generating the cargo scene data, the user invokes a command-line script to batch load the scene files located at the cloud storage service, specifying the VISL configuration for the muon tomography imaging system. The ERS then simulates the transmission and detection of cosmic muons through the shipping container scenes, generating tomographic data of the vehicles in various shipping containers. This data is then used to train an AI model to detect and inventory vehicles, including the newly identified electric vehicle, using the synthetic data that was generated using real data from a muon tomography scan.

The invention claimed is:

1. An apparatus for generating synthetic imagery for training artificial intelligence models for security and screening applications, comprising:
   at least one processor;
   at least one non-transient computer memory;
   an object library stored on said at least one non-transient computer memory including a pre-defined catalog of items selected from a group consisting of electronics, weapons, explosives, incendiaries, drugs and narcotics, luggage, backpacks, boxes, enclosures, vehicles, human figures, and other arbitrary items of interest;
   a data management module stored on said at least one non-transient computer memory and containing computer readable instructions executable by said at least one processor for loading and saving data files representing arbitrary shapes, objects, and geometries, and converting said data files into optimized data structures;
   a materials library stored on said at least one non-transient computer memory including a pre-defined catalog of physical materials and associated scan properties for different electromagnetic energies;
   a scene management module for selection of objects from said pre-defined catalog of items, virtually placing into interior volumes of said objects one or more other items from said pre-defined catalog of items and/or one or more of said physical materials, and generating a plurality of three-dimensional scenes comprising one or more said objects with interior items and/or interior materials, said plurality of three-dimensional scenes each comprising a collection of objects, materials and configuration parameters governing a simulation, including object position, internal composition of said objects, and motion, and scan properties for objects and materials in the scene, the module stored on said at least one non-transient computer memory and containing computer instructions executable by said at least one processor for storing compressed representations of objects, materials and properties into scene data configured to be uncompressed and loaded at run-time during simulation;

an electromagnetic radiation simulator stored on said at least one non-transient computer memory and containing computer readable instructions executable by said at least one processor for generating synthetic imagery for a particular scene using said associated scan properties, said electromagnetic radiation simulator configured to image said materials in said interior volumes of said objects;

a data generation module stored on said at least one non-transient computer memory and containing computer readable instructions executable by said at least one processor for converting collected data and measurements from virtual imaging sensors into various 2D and 3D image output formats, wherein the data generation module includes capabilities for post data processing to achieve specific image quality objectives; and a display interface module stored on said at least one non-transient computer memory and containing computer readable instructions executable by said at least one processor for creating, displaying, and interacting with 3D scenes composed of arbitrary shapes, objects, paths, points, and geometries based on user entries.

2. An apparatus according to claim 1, further comprising:
a virtual sensor library stored on said at least one non-transient computer memory containing electromagnetic emitter and detector properties defining how simulated electromagnetic radiation is emitted and collected, wherein said electromagnetic detector properties are selected from the group consisting of energy characteristics and profile, energy binning, frequency, amplitude, wavelength, beam configuration, emitter design and configuration, detector design and configuration, detector dimensions, detector resolution, exposure time, and gantry configuration.

3. An apparatus according to claim 1, further comprising:
an object selection module stored on said at least one non-transient computer memory containing computer readable instructions executable by said at least one processor that allow users to select and define various regions of a three-dimensional object to segment and subdivide objects into constituent components, parts, or regions of interest by specifying spatial measurements, paths, or bounding regions of interest or by using queries that evaluate stored material properties, including density, element, material type/class, or phase.

4. An apparatus according to claim 1, further comprising:
an object modification module stored on said at least one non-transient computer memory containing computer readable instructions executable by said at least one processor that allow scene objects to be modified using a variety of algorithmic and neural network-based methods.

5. An apparatus according to claim 4, wherein material properties may also be modified using the object modification module, allowing users to evaluate how electromagnetic waves and particles interact with different materials and optional color properties for those materials when displayed in the display interface.

6. An apparatus according to claim 1, further comprising:
a physics solver stored on said at least one non-transient computer memory containing computer readable instructions executable by said at least one processor to simulate various physical phenomena between fluids, fabrics, static and dynamic bodies, and soft and rigid bodies, including gravity, friction, repulsion, soft and rigid-body collisions, to simulate how objects may collide and interact with each other in world space.

7. An apparatus according to claim 1, further comprising:
an artificial intelligence module interface stored on said at least one non-transient computer memory containing computer readable instructions executable by said at least one processor to enable a user to load a new or existing AI model to train the model or to perform inference to evaluate model performance on various generated scenes.

8. An apparatus according to claim 1, wherein the data files represent simple or complex models, organic and manmade materials, human figures, vehicles, machines, packages, parcels, aircraft, or any other arbitrary item of interest.

9. An apparatus according to claim 1, wherein the optimized data structures include any combination of slices, voxels, surfaces, meshes, triangles, procedural geometries, grids, points, lines, curves, or other data structures.

10. An apparatus according to claim 1, wherein said scene management module further contains computer readable instructions executable by said at least one processor for packing objects into a variety of enclosures, for example a package, baggage, parcel, briefcase, pallet, box, human figure, cargo port, container, or vehicle.

11. An apparatus according to claim 1, wherein scene scale is dynamic and adjustable between very high resolution scenes to support micro-CT scans and large, lower resolution scenes to support simulated muon scans.

12. An apparatus according to claim 1, wherein said electromagnetic radiation simulator further contains computer readable instructions executable by said at least one processor for allowing a user to fine-tune the realism and speed of data generation by selecting various options that control the performance of the simulation engine to achieve desired results, for example, the number of images taken, the level of accuracy for the electromagnetic radiation simulator, sensor configuration, or to specify parameters regarding energy, propagation, absorption, reflection, and refraction of electromagnetic waves and particles with various bodies in a scene.

13. An apparatus according to claim 1, wherein the display interface module allows shapes to be placed in arbitrary positions in world space and allows objects to be modified using other system modules and wherein the display interface module includes a menu system that allows users to select and configure various functions in the system, including sub-windows that permit various preview images and renderings to be displayed within a primary window.

14. A method for generating synthetic imagery for training artificial intelligence models for security and screening applications, comprising:

building/assembling/storing a volumetric object library comprising firearms, explosives, incendiaries, narcotics, controlled substances, enclosures, vehicles, structures, animals, and human figures using a data management module that loads object data from a variety of 2D and 3D data as slices of real or virtual objects, surfaces, meshes, voxels, points, paths, lines, curves, 3D models, Computer-aided Design (CAD) files, or specified procedural geometries;

storing a material library to comprising a plurality of materials that may be virtually placed in interior volumes of items in said volumetric object library;

selecting one or more volumetric objects from the object library and selecting one or more materials from the materials library, virtually placing one or more said materials in said interior volumes of said volumetric objects, and generating a variety of scenes, wherein a scene management module packs or places objects into one or more enclosures randomly or using computerized instructions as part of a packing algorithm defined in a scene generation specification and wherein the scene management module is configured to use object layer data to alter material properties randomly or using specific algorithms;

loading and populating a scene from the volumetric objects in a scene file definition into an electromagnetic radiation simulation engine configured to handle the placement, orientation, sizing, motion, materials, and deformations from the scene file definition;

performing simulation of electromagnetic waves by the electromagnetic radiation simulation engine according to a supplied job configuration that details, wherein users may specify parameters regarding radiation energy, energy binning, frequency, amplitude, wavelength, propagation, absorption, reflection, and refraction of electromagnetic waves and particles with various bodies in a scene.

15. The method of claim 14, further comprising using a physics solver to process scene object properties and environmental settings to simulate how packed objects appear in the simulated enclosure, wherein hard objects, are placed into the scene with flexible materials and soft bodies, that simulates reality and wherein environmental parameters are used to control how objects are clustered or packed within the simulated enclosure to result in a set of scene files that are compressed representations of objects packed into an enclosure, each scene containing details on the specific objects in the scene, their positions, materials, and calculations governing the behavior and deformation of soft bodies in the scene.

* * * * *